Patented Aug. 17, 1954

2,686,783

UNITED STATES PATENT OFFICE 2,686,783

QUINOLYL DIALKYL PHOSPHATES AND SALTS THEREOF AND PROCESS FOR THE MANUFACTURE OF SAME

Alexander Lang Morrison, Frank Ratcliffe Atherton, and Kenneth John Maynard Andrews, Welwyn Garden City, England, assignors to Hoffmann-La Roche Inc., Nutley, N. J., a corporation of New Jersey No Drawing. Application May 29, 1951, Serial No. 228,974

Claims priority, application Great Britain June 2, 1950

7 Claims. (Cl. 260—286)

The present invention relates to new quinolyl-dialkyl-phosphates and salts thereof and to a process for the manufacture of the same.

The novel quinolyl-dialkyl-phosphates and their salts may be represented by the following general formulae:

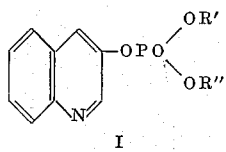

I and

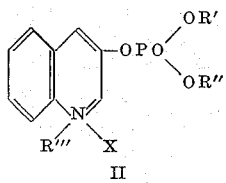

II wherein R' and R" stand for lower alkyl groups, R'" stands for hydrogen or a lower alkyl radical and X is an anion, such as a halogen ion or a methylsulphate ion.

The acid addition and quaternary salts depicted in Formula II above have a parasympathomimetic activity which is brought about by the inhibition of cholinesterase. Thus, for example, quinolyl-(3)-diethyl-phosphate, in the form of its methyl-methylsulphate, has an in vitro anticholinesterase activity greater than that of 1-N,N-dimethyl-carbamyloxy-3-dimethyl-aminobenzene methyl-methylsulphate.

The present invention also includes a process for the manufacture of these novel compounds, which process comprises reacting an alkali metal salt of 3-hydroxy quinoline with a di-(lower alkyl) halogenophosphate, preferably a di-(lower alkyl) chlorophosphate having not more than six carbon atoms in each alkyl radical thereof, and thereafter treating the quionlyl-(3)-dialkyl-phosphate so obtained with an acid, preferably a hydrogen halide, or an alkyl ester of a mineral acid.

The alkali-metal salt of the 3-hydroxy quinoline can be formed in situ by the action of an alkali-metal alcoholate on 3-hydroxy quinoline.

The reaction may be advantageously conducted in an inert atmosphere. Anhydrous or substantially anhydrous conditions are necessary.

The 3-hydroxy quinoline, used as a starting material in the process of the present invention, may be prepared by the method of Cavallito and Haskell, J. A. C. S., 1944, 66, 1169.

The following examples illustrate the way in which the present invention may be carried into effect:

*Example 1*

A hot solution of 3-hydroxy quinoline (4 g.) in ethanol (35 cc.) was added to ethanolic sodium ethoxide [prepared from sodium (0.65 g.) and ethanol (35 cc.)] in a nitrogen atmosphere. To the resulting solution diethylchlorophosphate (5 g.) was added dropwise over 15 minutes. Sodium chloride precipitated and the reaction mixture was heated under reflux for ½ hour. After the mixture had been allowed to stand for 15 hours, the sodium chloride was filtered off and the filtrate was evaporated in vacuo. The residual oil was dissolved in carbon tetrachloride (ca. 40 cc.) and extracted three times with 0.5 N sodium hydroxide solution and three times with water. The carbon tetrachloride solution was filtered and dried over anhydrous sodium sulphate. After evaporating off the carbon tetrachloride in vacuo, the residual oil was distilled at 120–124° C./1.1×10$^{-5}$ mm. to yield quinolyl-(3)-diethyl-phosphate having $n_D^{21}=$ 1.5360 (4 g.=52%).

Quinolyl-(3)-diethyl-phosphate (1.4 g.) was taken up in benzene (5 cc.) and dimethyl-sulphate (0.75 cc.) was added. On standing the mixture for 24 hours an oil separated which crystallized on trituration with ether. The crystalline quinolyl-(3)-diethyl-phosphate methyl-methylsulphate was collected in good yield (1.5 g.). It melted at 105–107° C. Recrystallization from alcohol-ether gave crystals melting at 106–107° C. (1.25 g.=72%).

*Example 2*

Sodium (0.65 g.) was dissolved in ethanol (35 cc.) and a hot solution of 3-hydroxy quinoline (4 g.) in ethanol (35 cc.) was added, in a nitrogen atmosphere. To the resulting solution diisopropyl-chlorophosphate (6 g.) was added dropwise over 15 minutes. Sodium chloride was precipitated and the reaction mixture was heated under reflux for ½ hour. After the mixture had been allowed to stand overnight, the sodium chloride was filtered off and the filtrate was evaporated in vacuo. The residual oil was dissolved in carbon tetrachloride (ca. 50 cc.) and extracted three times with N/2 caustic soda solution and three times with water. The carbon tetrachloride solution was filtered and dried over anhydrous sodium sulphate. After filtration and evaporation of the carbon tetrachloride from the filtrate in vacuo, the residual oil was distilled;

B. P. 120–124° C./2.3×10⁻⁵ mm. The yield of quinolyl-(3)-diisopropyl phosphate thus obtained was 69% (5.9 g.).

The methyl-methylsulphate was obtained as an oil by treating the latter phosphate with dimethyl-sulphate in benzene as described in Example 1.

*Example 3*

Quinolyl (3)-dimethylphosphate was prepared by the method described in Examples 1 and 2, using as starting materials 3-hydroxy-quinoline and dimethyl-chlorophosphate. An oil was obtained which solidified when an attempt was made to distill it—probably due to betaine formation. The methyl-methylsulphate was obtained when this oil was treated with dimethyl sulphate in the manner described in Example 1.

We claim:

1. A compound selected from the group consisting of quinolyl-(3)-di-(lower alkyl)-phosphate, a quaternary salt of quinolyl-(3)-di-(lower alkyl)-phosphate with a lower alkyl halide and a quaternary salt of quinolyl-(3)-di-(lower alkyl)-phosphate with a di-(lower alkyl)-sulfate.
2. Quinolyl-(3)-diethyl-phosphate.
3. Quinolyl-(3)-diethyl-phosphate methyl-methylsulphate.
4. Quinolyl-(3)-di(lower alkyl)-phosphate.
5. A quaternary salt of quinolyl-(3)-di(lower alkyl)-phosphate with a lower alkyl halide.
6. A quaternary salt of quinolyl-(3)-di(lower alkyl)-phosphate with a di(lower alkyl)-sulphate.
7. A process which comprises reacting an alkali metal salt of 3-hydroxy-quinoline with diethyl-chlorophosphate in a solvent substantially free of water, and treating the quinolyl-(3)-diethyl-phosphate obtained with dimethyl-sulphate so as to produce quinolyl-(3)-diethyl-phosphate methyl-methylsulphate.

References Cited in the file of this patent

UNITED STATES PATENTS

| Number | Name | Date |
|---|---|---|
| 2,480,056 | Smith et al. | Aug. 23, 1949 |

FOREIGN PATENTS

| Number | Country | Date |
|---|---|---|
| 283,334 | Germany | Apr. 9, 1915 |

OTHER REFERENCES

Chemiker-Zeitung, Mar. 27, 1901, No. 26, page 280.